United States Patent [19]

Witt et al.

[11] 4,015,651

[45] Apr. 5, 1977

[54] TIRE CORD CODING SYSTEM

[75] Inventors: Jerry L. Witt, Winnsboro, S.C.;
Barry B. Holmes, Miami Shores, Fla.

[73] Assignee: Uniroyal Inc., New York, N.Y.

[22] Filed: May 22, 1975

[21] Appl. No.: 579,769

[52] U.S. Cl. .............................. 152/356; 152/359;
152/330 R; 152/361 R; 156/64
[51] Int. Cl.² ...................... B60C 9/16; B60C 9/20
[58] Field of Search ...... 152/354, 357, 359, 361 R,
152/330 R, 356; 156/64; 139/383, 416, 420

[56] References Cited

UNITED STATES PATENTS

| | | | |
|---|---|---|---|
| 2,920,674 | 1/1960 | Bull | 152/361 R |
| 3,511,293 | 5/1970 | Matthews | 152/330 R |

*Primary Examiner*—Drayton E. Hoffman
*Attorney, Agent, or Firm*—Lawrence E. Sklar

[57] ABSTRACT

In a tire cord fabric, especially one comprising a multiplicity of parallel steel cords, an improvement is provided whereby the various sources of supply of the tire cords may be identified. In a preferred embodiment, the improvement comprises the substitution of at least one pair of modified steel cords, for example spirally wrapped steel cords, for an equal number of regular steel cords with the spirally wrapped cords being spaced from each other by a particular number of the regular cords for each cord manufacturer. For example, a spacing of 10 regular cords between a pair of special cords may represent manufacturer A, while a spacing of 12 regular cords between a pair of special cords may represent manufacturer B, etc. Thus, each of several sources of supply of the regular cords may be identified according to the number of regular cords between a pair of special cords. This abstract is not to be taken either as a complete exposition or as a limitation of the present invention, however, the full nature and extent of the invention being discernible only by reference to and from the entire disclosure.

13 Claims, 3 Drawing Figures

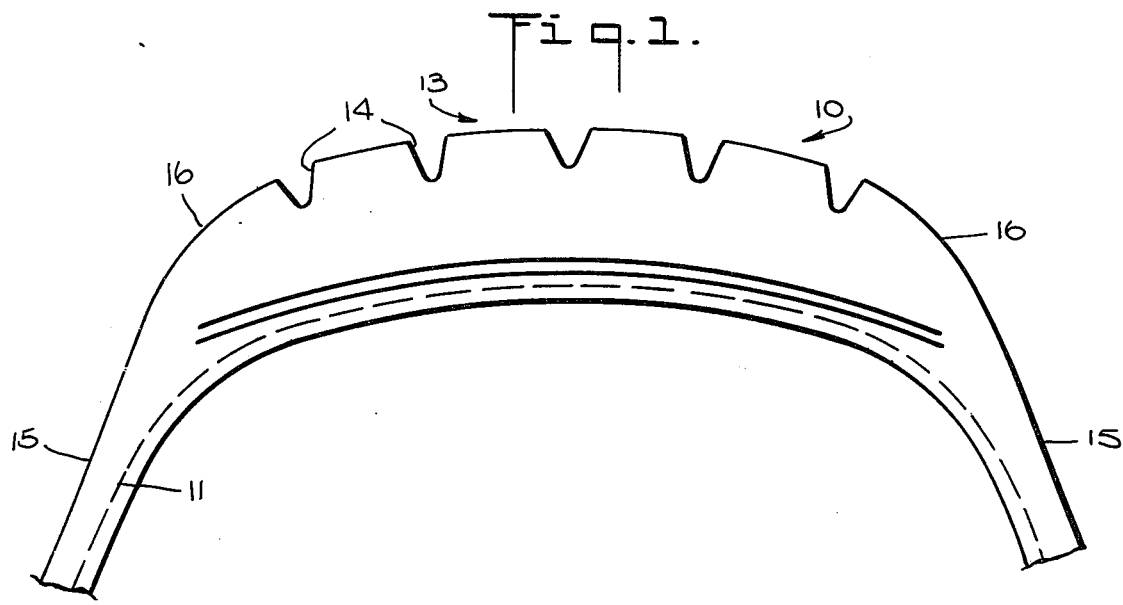
Fig. 1.
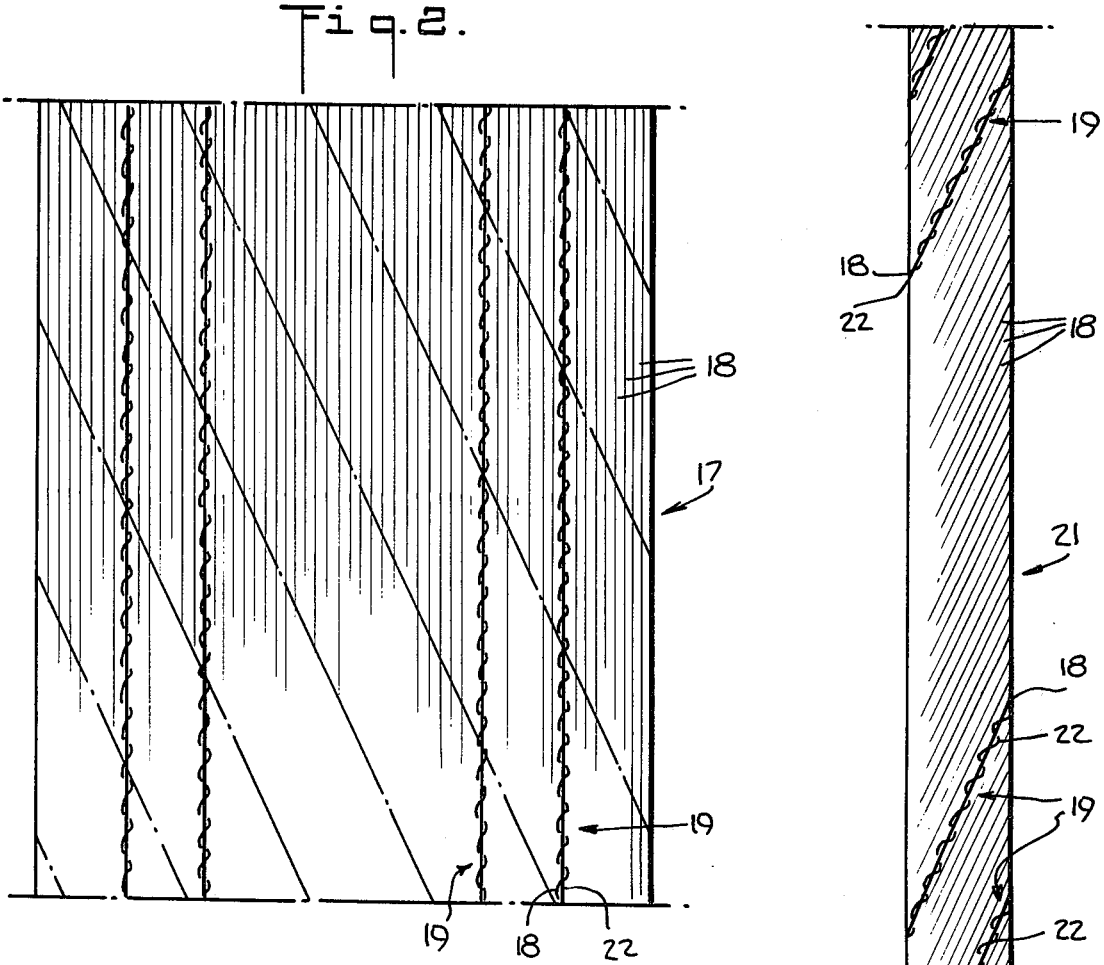
Fig. 2.
Fig. 3.

TIRE CORD CODING SYSTEM

The instant invention relates to a system for identifying each of the several sources of supply of the cords used in manufacturing pneumatic tires, and more particularly to a non-destructive system for identifying the source of supply of the steel cords incorporated in any given pneumatic tire.

BACKGROUND OF THE INVENTION

Tire cord fabric (normally consisting of a layer of like cords of filamentary material) is usually made by the manufacturer thereof from cords purchased from a cord producer. Each tire cord fabric manufacturer will, of course, have several sources of supply of cords. It may sometimes become essential to be able to identify the source of a given batch of tire cords once the same has been used to form a given fabric lot, for example if the ultimate tire manufacture finds that lot of tire cord fabric to be defective in one property or another of the cords, or perhaps to have led to the manufacture of defective tires.

SUMMARY OF THE INVENTION

It is an important object of the instant invention, therefore, to provide a system whereby each of the several sources of supply of the tire cords may be identified, even if the cords are incorporated in a finished tire.

To this end, the instant invention provides an improvement in tire cord fabric comprising a multiplicity of parallel, regular cords. The improvement comprises the inclusion in such a fabric of at least one pair of special cords parallel to the regular cords spaced from one another by a particular number of the regular cords, and the special cords and regular cords being distinguishable by X-rays in a finished tire according to their different constructions. A different number of spacing cords is used for each cord manufacturer. The source of any given set of regular cords thus may be identified according to the number of such cords between a pair of special cords. The invention is of particular applicability to steel tire cords which are currently finding widespread use in radial ply tires.

BRIEF DESCRIPTION OF THE DRAWINGS

FIG. 1 is a schematic, sectional, axial view of a belted pneumatic tire embodying the present invention.

FIG. 2 is a fragmentary schematic plan view of the tire cord fabric used to form the belts in the tire shown in FIG. 1.

FIG. 3 is a fragmentary schematic plan view of a belt ply fabric formed from fabric shown in FIG. 2.

DESCRIPTION OF THE PREFERRED EMBODIMENT

In describing the preferred embodiment, reference is made to the drawings, wherein FIG. 1 depicts a belted pneumatic tire generally designated 10. The tire 10 comprises a carcass 11 which may be of radial ply or bias ply construction and may be of steel or other suitable cord, and either in a mono-ply or multi-ply arrangement, and two steel cord breakers or belts 12. The belts 12 are superposed one on the other and both are shown as positioned between the crown region of the carcass 11 and a tread 13 for reinforcing the latter, although they may be positioned below one or more of the plies of the carcass. The tread 13 is formed with a plurality of traction grooves 14, in a manner customary in the art. Sidewalls 15 overlie the lateral portions of the carcass 11, and the tread 13 is joined to the sidewalls 15 in the region of the shoulders 16. The belts 12 are normally formed from rubberized tire cord fabric comprising a plurality of regular, parallel steel cords. Once such belts are built and cured into the tire, of course, non-destructive analysis and identification of the cords is ordinarily rendered impossible.

Referring now to FIG. 2, it can be seen that the present invention overcomes this problem by providing in each batch of tire cord fabric 17 having regular steel cords 18, two pairs of spirally wrapped steel cords 19 which are substituted for an equivalent number of the regular steel cords. The substitution generally involves no more than drawing in the spirally wrapped cords 19 through a fabric calender, or in the case of woven material through a loom with the regular cords 18. The number of regular cords 18 between a pair of spirally wrapped cords 19 will be predetermined for each supplier of cords. In FIG. 2, the spacing is shown as six regular cords 18 between each pair of spirally wrapped cords 19, but obviously different cord spacings can be used. A code can thus be set up with a number of different special cord spacings (e.g., 10 cords apart, 12 cords apart, 14 cords apart, etc.), each representing a respective one of the various sources of supply of the tire cords. Each pair of spirally wrapped cords 19 is spaced a maximum of about 20 inches from the next succeeding pair so that even after the fabric has been bias-cut, as indicated by the broken lines 20 (see FIG. 2), and respliced in conventional manner to form a belt ply fabric 21 (FIG. 3), at least one pair of spirally wrapped cords 19 will appear in the smallest size belt.

The spirally wrapped steel cords 19 as well as the regular steel cords 18 are visible during X-ray analysis or upon separating plies during failure analysis. By counting the number of regular cords 18 between a pair of spirally wrapped cords 19 in the belt, therefore, the supplier of the regular cords can be identified.

After the fabric 17 has been incorporated as a belt in the tire, it is possible to perform both destructive and non-destructive tests to determine which source of supply of tire cords was used in building the particular tire belts 12. Where non-destructive analysis of tires is required, whether new or old, X-ray photography may be utilized. The spirally wrapped cords 19 can be readily distinguished from the regular cords 18 on an X-ray photograph.

In many cases, destructive analysis of a tire is permissible since the damage has already occurred to the tire. In this case, the tire plies may be phyisically examined, rather than photographed by X-rays, to determine the spacing between the special cords 19.

In the preferred embodiment of the invention illustrated in the drawings, the special cords 19 comprise a replacement for an equivalent number of the regular fabric cords 18. It is possible, however, to merely add the special cords 19 to the regular cords 18 comprising the fabric. It should also be noted that if the regular cords, rather than the special cords as discussed above, are spirally wrapped steel cords, that two non-wrapped cords could be inserted at a predetermined end spacing, which would be detectable by X-ray. Moreover, other cords which are deemed to have suitable mechanical properties, such as high modulus organic cords or glass cords, and which are distinguishable from the regular cords on X-ray analysis may be employed as special cords.

For spirally wrapped steel cords, each such cord 19 comprises a regular steel cord 18 spirally wrapped with steel wire 22 of substantially the same composition as the regular steel cord 18. By proper selection of the cord construction used, the diameter of the spirally wrapped cords may be approximately the same as that of the regular cords. The pitch of the spiral wrapping wire 22 is typically about 0.4 inch per wrap.

Although the invention has been described in terms of fabric to be employed as a breaker ply or belt, it is to be understood that the invention is not only applicable to fabric formed from steel cords, but also to fabric formed from nylon, rayon, polyester and glass fiber cords.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. In a tire cord fabric adapted for use in a pneumatic tire and having means incorporated therein for identifying the source of the tire cords, said fabric comprising a multiplicity of parallel, regular cords, and at least one pair of special cords parallel to said regular cords, said special cords and regular cords each being visible and distinguishable by X-rays according to their different constructions, and each special cord in a pair of special cords being spaced from each other by a particular number of identifiable regular cords, with each particular number of spacing cords being a code representing a respective source of said regular cords whereby any given source of the regular cords in the fabric may be identified according to the code represented by the number of said regular cords between a pair of said special cords.

2. The tire cord fabric of claim 1, wherein all the cords are steel cords, and said special cords are spirally wrapped with a material which is also visible and distinguishable by X-rays.

3. The tire cord fabric of claim 1, wherein all the cords are steel cords, and said regular cords are spirally wrapped with a material which is also visible and distinguishable by X-rays.

4. The tire cord fabric of claim 1, wherein said special cords are included in addition to the normal number of regular cords, whereby the total number of all cords in the fabric is increased with respect to an identical fabric lacking said special cords.

5. The tire cord fabric of claim 1, wherein said special cords are included as replacements for an equivalent number of regular cords, whereby the total number of all cords in the fabric is the same as in an identical fabric lacking said special cords.

6. The tire cord fabric of claim 1, wherein a pair of special cords is laterally spaced a maximum of about 20 inches from the next adjacent pair of special cords.

7. In a pneumatic tire including one or more plies of tire cord fabric reinforcement having in each ply a multiplicity of parallel, regular cords, the improvement wherein the fabric in at least one of said plies thereof includes means incorporated therein for identifying the source of the tire cords, said fabric comprising at least one pair of special cords parallel to the regular cords, said special cords and regular cords each being visible and distinguishable by X-rays in said tire according to their different constructions, and each special cord in a pair of special cords being spaced from each other by a particular number of the identifiable regular cords, with each particular number of spacing cords being a code representing a respective source of said regular cords, whereby any given source of the regular cords in the fabric constituting said ply may be identified according to the code represented by the number of regular cords between a pair of said special cords.

8. The tire of claim 7, wherein all the cords in the fabric constituting said ply are steel cords, and the special cords are spirally wrapped with a material which is also visible and distinguishable by X-rays.

9. The tire of claim 7, wherein said special cords are included in the fabric in addition to the normal number of regular cords, whereby the total number of all cords in the fabric is increased with respect to an identical fabric lacking said special cords.

10. The tire of claim 7, wherein said special cords are included in the fabric as replacements for an equivalent number of regular cords, whereby the total number of all cords in the fabric is the same as in an identical fabric lacking said special cords.

11. The tire of claim 7, wherein a pair of special cords in said ply is laterally spaced a maximum of about 20 inches from the next adjacent pair of special cords in the same ply.

12. The tire of claim 7, wherein the fabric reinforcement is a carcass, and said fabric containing said special cords constitutes a ply of said carcass.

13. The tire of claim 7, wherein the fabric reinforcement is a belt, and said fabric containing said special cords constitutes a ply of said belt.

* * * * *